Aug. 7, 1945.　　　　E. E. BUCHAN　　　　2,381,571
FEEDER FOR DIE PRESSES
Filed Nov. 18, 1944　　　　2 Sheets-Sheet 1
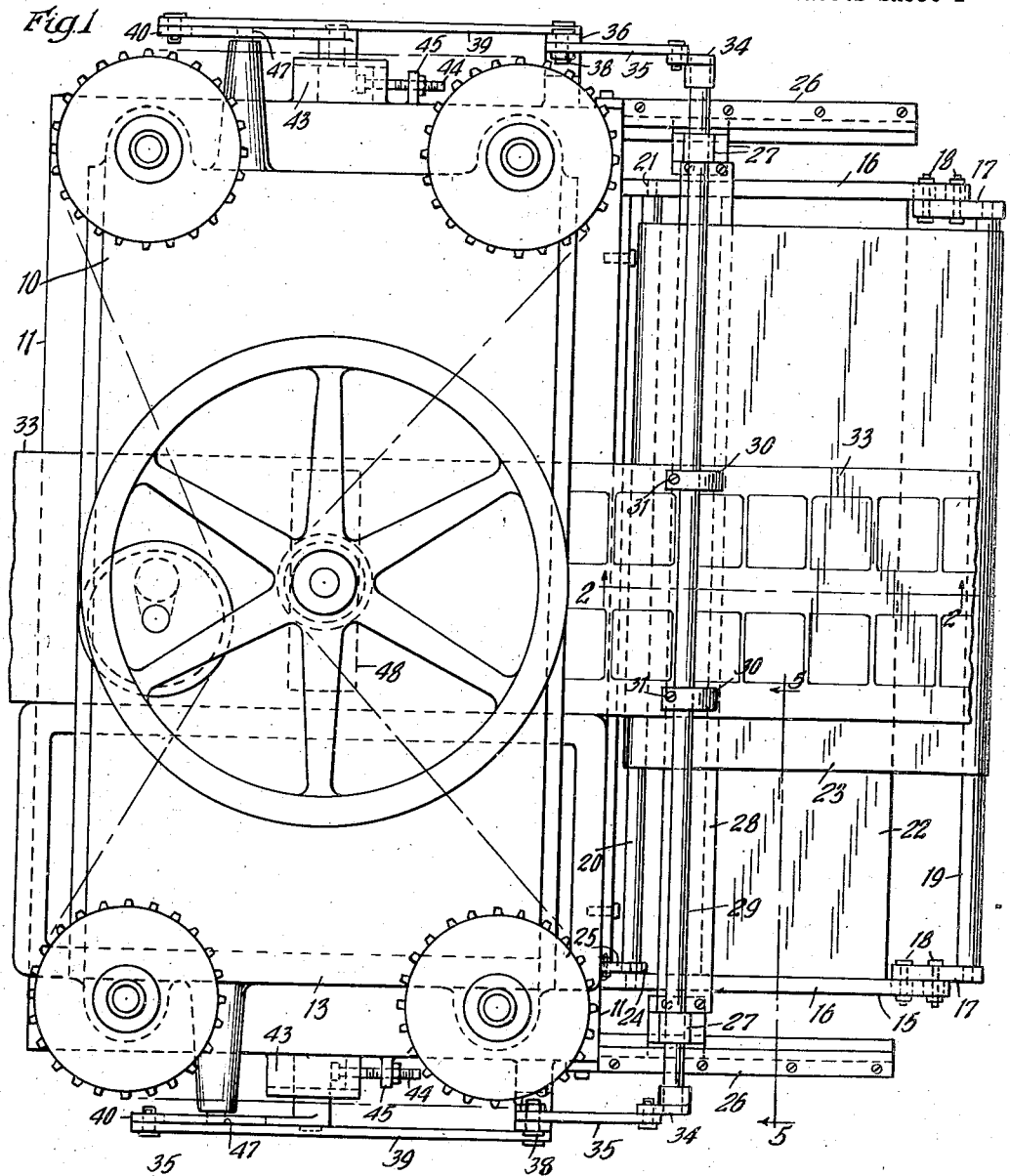
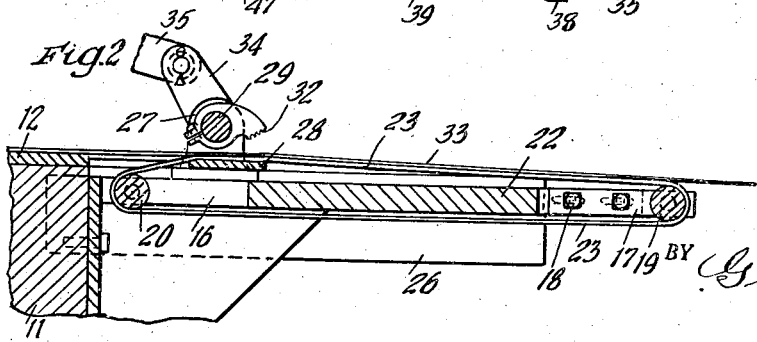
INVENTOR.
Elmer E. Buchan
BY Glenn S. Noble
Atty.

Aug. 7, 1945.　　　　E. E. BUCHAN　　　　2,381,571
FEEDER FOR DIE PRESSES
Filed Nov. 18, 1944　　　　2 Sheets-Sheet 2
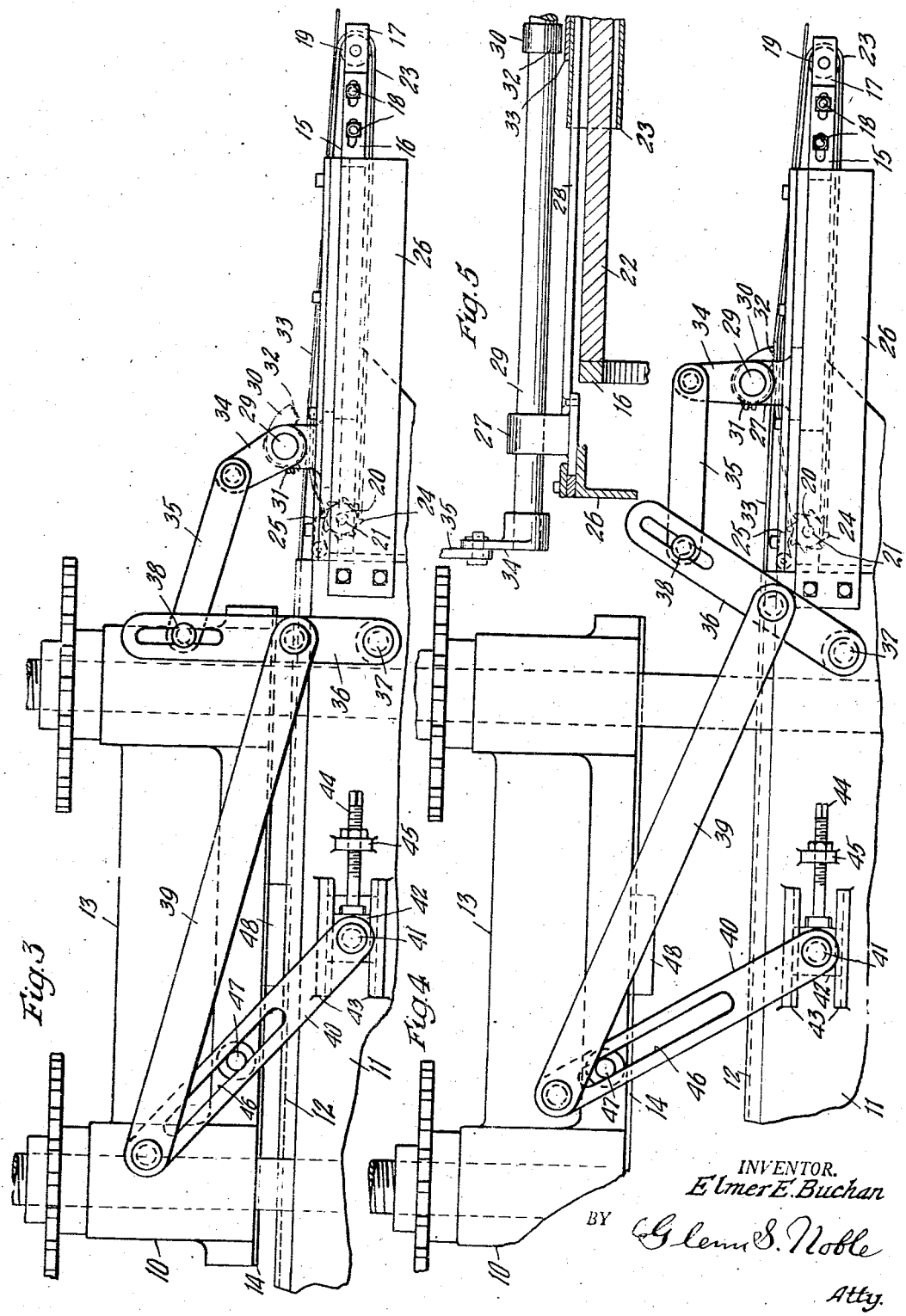
INVENTOR.
*Elmer E. Buchan*
BY *Glenn S. Noble*
Atty.

Patented Aug. 7, 1945

2,381,571

UNITED STATES PATENT OFFICE 2,381,571

FEEDER FOR DIE PRESSES

Elmer E. Buchan, Chicago, Ill.

Application November 18, 1944, Serial No. 564,124

5 Claims. (Cl. 164—21)

This invention relates particularly to feeders for die cutting presses such as are in common use and which are used for making a large variety of articles from various materials such as paper, cardboard, fiber-board, cork board and various other materials. One use for such die cutting presses is in the manufacture of gaskets for engines, compressors, carbureters, or the like. The material to be operated upon may be either in the form of sheets or rolls and such machines are customarily fed by hand.

In accordance with the present invention, I provide a feeder or means readily applicable to various types of presses, for feeding the material through the machine, step by step, in accordance with the strokes of the press whereby the feed will be automatic.

The principal object of the present invention is to provide a feeder for the purposes set forth which will be simple in construction and readily applied to the presses and which will be particularly efficient in operation; to provide a die cutting press with a feeder for moving the material which is being operated upon, therethrough; to provide a die cutting press with a discharge table and means for intermittently moving the stock along such table; and to provide such further novel features and advantages as will be shown and described hereinafter.

In the accompanying drawings illustrating this invention,

Fig. 1 is a plan view of a press with my feeder applied thereto or incorporated therewith;

Fig. 2 is a sectional detail taken on the line 2—2 of Fig. 1;

Fig. 3 is a side view showing a portion of the machine on an enlarged scale with the feeder in retracted position;

Fig. 4 is a similar view showing the feeder in advanced position; and

Fig. 5 is a sectional detail taken substantially on the line 5—5 of Fig. 1;

In these drawings, parts are shown diagrammatically or omitted for convenience in illustration. As shown in these drawings, the press indicated generally by the numeral 10 may be of any ordinary or preferred construction, such presses being well known and in general use. The press has a main frame 11 which is provided with a table 12. A reciprocable head 13 is operatively mounted above the table and carries a platen or cutter supporting member 14. The head is provided with any suitable means for reciprocating and adjusting the same, these parts constituting portions of the main press.

Ordinarily the work pieces or the material to be acted upon is fed through the machine by hand, such material being usually in the form of sheets, webs or rolls. For instance, in the manufacture of gaskets, or the like, the material may be special cork or fiber board, and in the manufacture of labels, envelopes, or the like, the stock will ordinarily be of paper, but such machines are used in a large number of different industries.

In accordance with the present invention, I provide a feeder whereby the stock may be automatically fed through the machine as the work progresses. In the present form of the invention, a frame 15 is secured to the back of the press with its upper portion at approximately the same height as the table or bed 12. This frame includes side bars 16 which carry adjustable brackets or bearings 17 which may be adjusted by means of the bolts 18 extending through slots in the bars as shown. A roller 19 is mounted in the bearings. Another roller 20 is rotatably mounted in bearings 21 in the bars 16 adjacent to the table 12. The frame 15 also includes extension table or board 22 as shown particularly in Fig. 2.

A broad belt or apron 23 passes around the rollers 19 and 20, the roller 20 being provided with a ratchet wheel 24 which coacts with a pawl 25 on the frame to prevent the reverse movement of the belt, as will presently be explained. The frame 11 is also provided with rearwardly extending bars or guideways 26 which support a pair of reciprocable bearings 27 which are adapted to move longitudinally thereof. These bearings are connected by means of a cross plate or bar 28.

A shaft 29 is rotatably mounted in the bearings 27 and carries a plurality of dogs or pawls 30 for engagement with the stock or material to be fed through the machine. These dogs are adjustably mounted on the shaft by being split and provided with clamping screws 31. The engaging faces 32 are preferably toothed or knurled to insure good engagement with the sheet of stock or material 33. As will be seen from Fig. 2, the cross bar or strip 28 extends across below the upper reach of the belt or apron 23, and the stock 33 passes over the belt and below the dogs, the arrangement being such that when the crimping ends of the dogs move downwardly, they will engage with the stock and press it and the belt against the cross bar 28 so that the stock will be drawn along and the belt will be rotated when the parts carrying the dogs are moved rearwardly or toward the discharge end of the machine.

Suitable mechanism is provided for thus reciprocating and rotating or vibrating the shaft 29 and the parts associated therewith. In the present construction, short arms 34 are secured to the ends of the shaft and are connected by means of links 35 with the upper ends of levers 36 which are pivoted at 37 to the main frame of the press. Adjustment is provided between the links 35 and levers 36 by means of bolts 38 which engage with slots in the levers as shown.

The levers 36 are also connected by means of links 39 with the upper ends of operating levers 40. The lower ends of the operating levers are pivotally connected at 41 with slidable bearings 42 mounted in guideways 43 on the frame. Adjustment of the bearings is provided by means of screws 44 which are connected with the bearings and engage with lugs 45 on the frame. The operating levers 40 are provided with slots 46 which are engaged by pins or trunnions 47 extending outwardly from the reciprocable head 13.

The operation of the apparatus will be readily understood particularly from Figs. 3 and 4. Fig. 3 shows the head 13 in depressed or cutting position at which time the cutting die 48 is in engagement with or has cut through the sheet or stock 33. When the head starts to move upwardly, the pins or trunnions 47 act on the operating levers 40 and move their free ends upwardly as shown in Fig. 4. During this movement, the linkage between such levers and the shaft 29 first causes the shaft to be rotated until the dogs 32 engage with the stock and closely grip the same. The further movement causes the shaft 29 and parts connected therewith to move outwardly or toward the discharge end of the machine, thus drawing the stock along or feeding it through the machine as desired.

Upon the next downward movement of the head, the reverse action takes place, the dogs being raised and the shaft and parts connected therewith being returned to initial position. It will be noted that during this movement, the ratchet wheel 24 and pawl 25 will prevent the reverse movement of the belt so that the belt always continues its rotation in one direction. The cutters or dies 48 may be of any desired form, such dies being frequently made of steel cutting rule, or the like. The parts cut out or scored from the sheet to be removed therefrom, will be carried along by the belt to the outer discharge position so that these parts will not become prematurely disengaged. This tends to prevent improper discharge of the parts or clogging of the machine.

It will be readily seen that by means of the several adjustments of the operating links and levers, any desired throw of the feeder may be provided within the operating limits of the apparatus.

While I have shown and described a preferred embodiment of my invention, it will be readily seen that changes may be made in the details of construction or arrangement of the parts to adapt the same to different presses or for feeding different materials, or for other reasons, and therefore I do not wish to be limited to the particular construction herein shown and described except as set forth in the following claims:

I claim:

1. The combination with a die cutting press, of an extension table, a belt carried by said table for receiving the work pieces after they pass through the press, reciprocable means coacting with the belt for gripping the work pieces, and means actuated by the machine for causing the gripping means to engage the work pieces and for reciprocating said means to advance the work pieces.

2. The combination with a press, of a broad belt mounted transversely of the press at the discharge end thereof for receiving sheets after they have passed through the press, means for preventing the reverse movement of said belt, grippers rotatably and slidably mounted adjacent to the belt, for engagement with the sheets to press them against the belt and to feed them along with the belt, and means actuated by the press for rotating and sliding said grippers.

3. The combination with a cutting press, of a discharge table, guideways along said table, bearings slidably mounted in said guideways, a shaft carried by said bearings, grippers on the shaft for engagement with the stock after it has been acted upon by the press, and linkage means actuated by the press and connected with said shaft for vibrating the shaft and for moving it longitudinally of the guideways.

4. A punch press including a bed portion and a reciprocating head, a discharge table extending rearwardly of the bed portion and adapted to receive the stock after it has passed through the press, guideways adjacent to the discharge table, bearings slidably mounted in said guideways, a shaft carried by said bearings and extending transversely of the press, grippers adjustably mounted on the shaft and adapted to draw the stock through the press, arms secured to said shaft on either side of the press, levers pivoted to the bed and extending upwardly, adjustable links connecting the arms with the levers, operating levers, means for adjustably pivoting the lower ends of said operating levers to the bed, links connecting the upper ends of said operating levers with the first named levers, and pins secured to the head and extending through slots in said operating levers, the arrangement being such that when the head is reciprocated, the links and levers will cause the gripper shaft to be actuated to move the grippers into engagement with the stock and feed the same through the press.

5. The combination with a press of the character set forth having a base and provided with a reciprocating head, of a frame secured to the back of the base at approximately the same height as the bed of the press, bearings adjustably secured to the frame, a roller carried by said bearings, a second roller carried by the bearings adjacent to the base, an endless belt passing around said rollers, a ratchet wheel on one of said rollers, a pawl on the frame coacting with the ratchet wheel to prevent reverse movement of the belt, guideways adjacent to the frame, bearings slidably mounted on said guideways, a cross bar connecting said bearings, a shaft mounted in the bearings, a plurality of dogs adjustably secured to the shaft and adapted to engage with the stock to be fed through the machine as it passes over said belt, said cross bar extending below the upper reach of the belt adjacent to said dogs whereby the dogs will coact therewith to grip the stock and the belt for feeding the stock and moving the belt, arms secured to the ends of the shaft, levers pivoted to the main frame of the machine adjacent to the arms, links securing the free ends of the arms with the upper ends of the levers, operating levers pivotally connected with slidable bearings mounted in guideways on the frame, means for adjusting said bearings, links connecting the free ends of the operating levers with the last named levers, and trunnions extending outwardly from the head of the press and engaging slots in said operating levers, the arrangement being such that the reciprocating movement of the head will act through said links and levers to cause the dogs to engage with the stock and feed it through the press, substantially as described.

ELMER E. BUCHAN.